United States Patent [19]

Douglas

[11] Patent Number: 5,355,729
[45] Date of Patent: Oct. 18, 1994

[54] SPLIT WEIGHT WHEEL BALANCING

[75] Inventor: Michael W. Douglas, St. Peters, Mo.

[73] Assignee: Hunter Engineering Company, Bridgeton, Mo.

[21] Appl. No.: 824,999

[22] Filed: Jan. 24, 1992

[51] Int. Cl.5 .................. G01M 1/08; G01M 1/38
[52] U.S. Cl. ........................... 73/468; 73/462
[58] Field of Search .............. 73/468, 462, 470; 364/463, 506, 507, 508

[56] References Cited

U.S. PATENT DOCUMENTS

| 4,068,532 | 1/1978 | Green et al. | 73/462 |
| 4,154,112 | 5/1979 | Hofmann | 73/462 |
| 4,357,832 | 11/1982 | Blackburn et al. | 73/462 |
| 4,817,003 | 3/1989 | Nagase et al. | 73/462 |

Primary Examiner—Hezron E. Williams
Assistant Examiner—Helen C. Kwok
Attorney, Agent, or Firm—Polster, Lieder, Woodruff & Lucchesi

[57] ABSTRACT

Wheel balancer design informs the user to apply correction weight(s) on one or two planes of the wheel tire assembly. A comprehensive combination of a "split weight" key and display usage allows the user to split a singular weight into a variety of choices involving two (or more) weights. The two weights are applied at the proper angular displacements so as to provide perfect imbalance correction using standard size incremental weights.

11 Claims, 5 Drawing Sheets

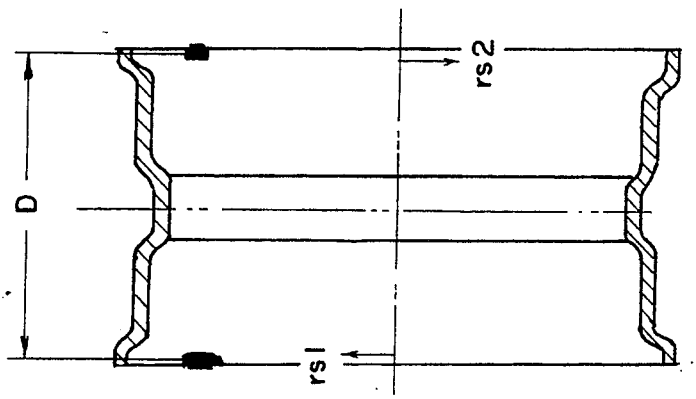
FIG. 1A. PRIOR ART.
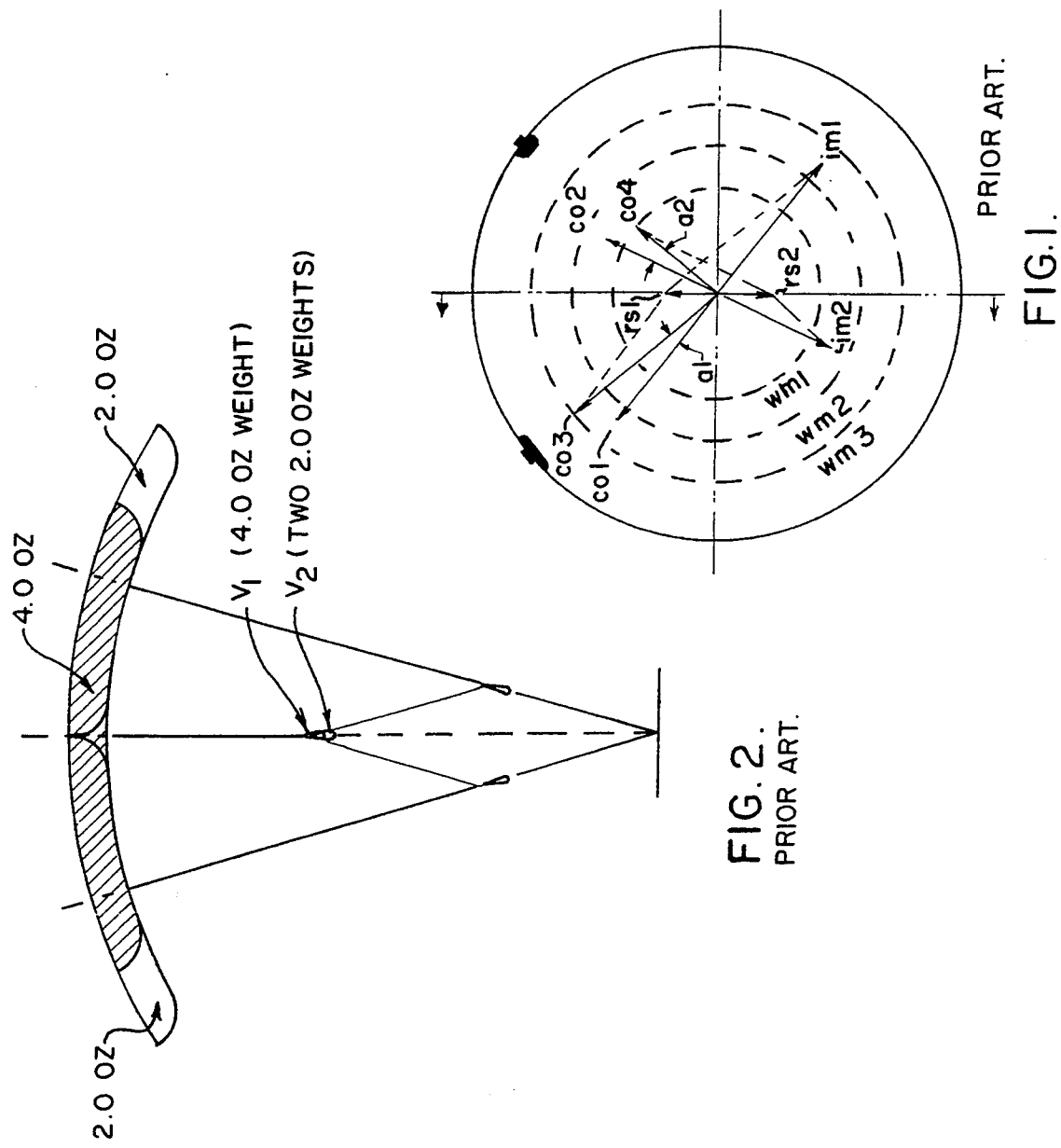
FIG. 1. PRIOR ART.
FIG. 2. PRIOR ART.

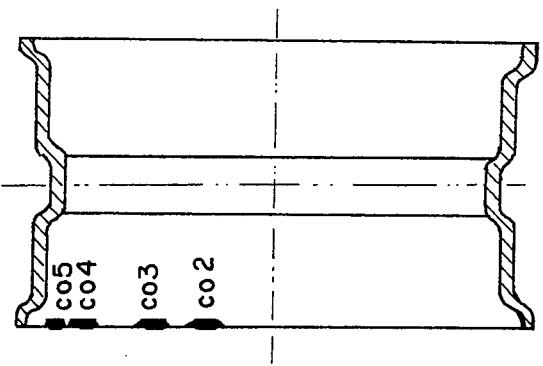
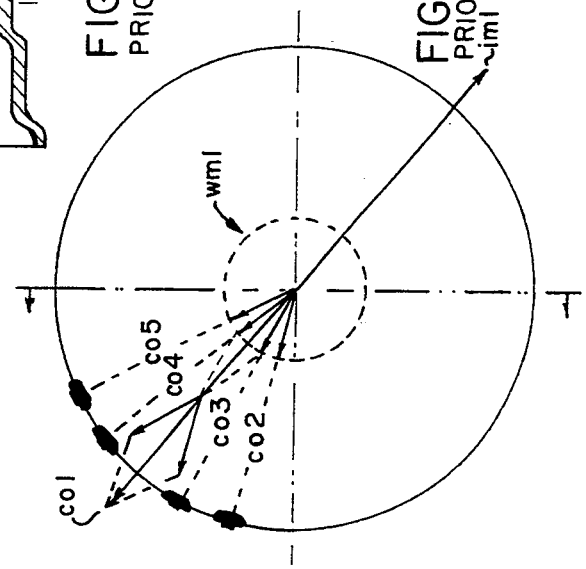
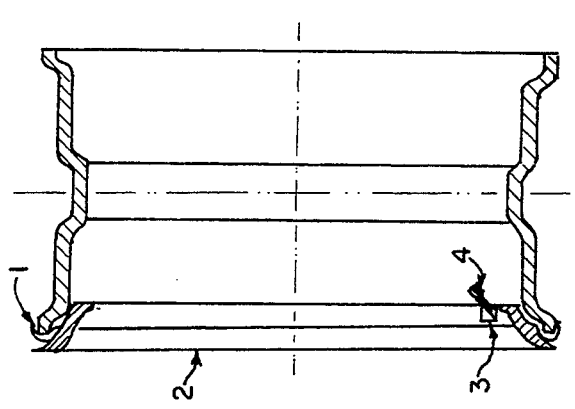
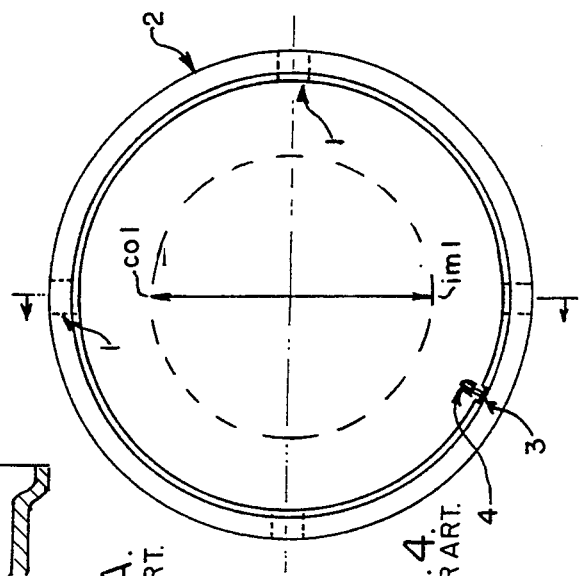
FIG. 3A. PRIOR ART.
FIG. 3. PRIOR ART.
FIG. 4A. PRIOR ART.
FIG. 4. PRIOR ART.

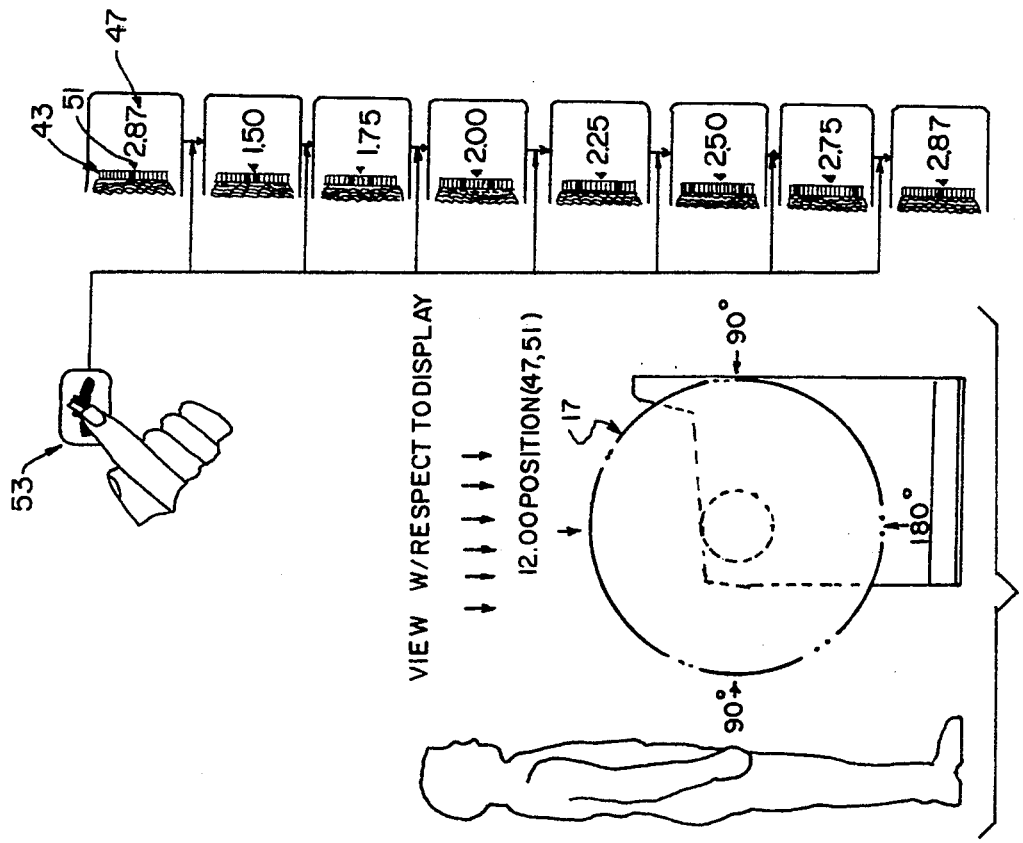
FIG. 11.
FIG. 9.
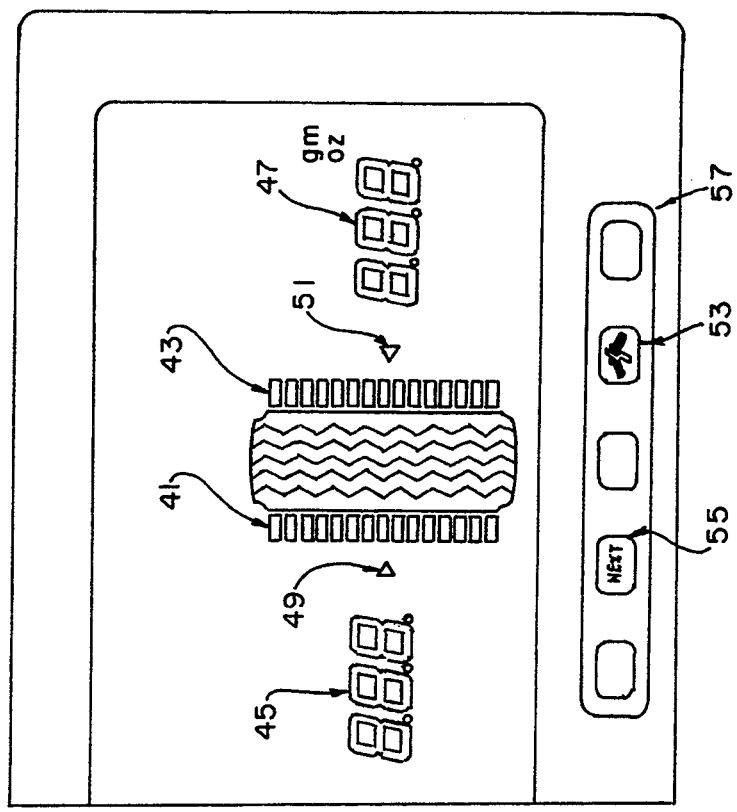
FIG. 8.

SPLIT WEIGHT WHEEL BALANCING

BACKGROUND OF THE INVENTION

The present invention relates to a machine for balancing motor vehicle wheels of different sizes and types, in particular to determining and displaying the required correction weight sizes and angular locations of said weights to balance the assembly.

DISCUSSION OF PRIOR ART

Balancers in the intended market for this invention normally guide the user to apply correction weights to the wheel/tire in the same fundamental way. Wheel position is determined by a two channel quadrature encoder responding to the mounting shaft movement. The required weight magnitudes for one or two correction planes is displayed in either ounce or grams units to provide static or dynamic imbalance correction. The tire is turned by the user until a center LED, lamp, or representation of a center position on a display screen illuminates. It is understood that at this position the weight is to be applied to the wheel rim at the 12 o'clock position (straight up).

It is well known in the art that after the magnitude and angular location of a wheel/tire imbalance is determined by the balancer, some means of weight magnitude adjustment (typically rounding) must be employed to instead display an increment of weight available from the weight manufacturers (typically 0.25 ounces for English and 5 grams for metric). Shops which desire to do more precise balancing can program the machine to display actual imbalance, but this requires guesswork and labor to trim the weight to the exact required amount with the weight tool cutter. A choice must be made on these machines between allowing some residual imbalance or spending extra labor to hand-trim the weights. U.S. Pat. No. 4891981 to Schonfeld addresses this problem by providing incremental weight amount correction and continuous weight placement angle correction for both planes during dynamic balancing to provide minimum residual static imbalance.

Referring to FIG. 1, im1 and co1 represent inner-plane (the side of the wheel which mounts on the car) imbalance and correction vectors, respectively, which fall between two standard weight magnitude increments represented by circles labeled wm1, wm2, and wm3. Note that these circles represent force magnitudes and are not to be confused with physical rim diameters. Similarly, im2 and co2 represent similar vectors for the outer correction plane. The imbalance vectors im1 and im2 are separated by an axial distance D (FIG. 1A).

To enable the use of an incremental size weight, the system chooses the next highest weight size wm3 to correct for im1, shown as the co3 vector. It chooses the next lowest wm1 to correct for im2, shown as the co4 vector. It then modifies the displayed weight placement locations by angle a1 for the inner plane weight placement and by angle a2 for the outer plane. The residual static unbalances rs1=im1+co3 and rs2=im2+co4 cancel. Unfortunately, a residual dynamic imbalance exists because of plane separation distance D as shown by the rs1 and rs2 forces in the side view (FIG. 1A).

A second problem in the prior art is that sometimes the displayed weight magnitude is not convenient for the user. The weight may not be available because it is out of stock or because the shop does not wish the expense of inventory for every size weight available. If the magnitude required is larger than say, four (4) ounces, the user often applies two weights instead (each half of the original magnitude) because he does not trust a large weight to stay mounted on the wheel.

Unfortunately, this practice further increases the magnitude error if the originally displayed weight was rounded down. This is because two smaller weights of half the magnitude of the single weight cannot be placed on top of each other, but must be separated by at least the physical width of said weights so as not to touch. FIG. 2 shows a four (4) oz. weight (cross-hatched lines) being applied instead by a pair of two (2) oz. weights. The resulting imbalance correction v2 falls short of the required correction magnitude v1 due to the angular displacement of the two weights along the rim diameter. If the original four (4) oz. weight was already rounded down from say, 4.1 oz., then the error is magnified by this splitting process.

Multiple applications of one predetermined weight on each plane addresses these problems as described by U.S. Pat. Nos. 4068532 and 3550455, both issued to Green et al. Such a scheme is shown in FIG. 3 wherein an imbalance im1 has a corresponding correction force vector co1 which lies beyond the predetermined weight magnitude circle wm1. The correction co1 can be exactly produced as the sum of smaller force vectors lying on the wm1 circle. This method, however, can require many weights per plane to compensate for large imbalances. Moreover, this method of using only one size correction mass to balance wheels is simply not done in the intended market for the present invention.

A third problem in the prior art is that sometimes the called-for weight placement spot is not convenient for the user. An obstruction might exist on the wheel rim at the intended weight placement spot. An example of this is shown in FIG. 4 where the correction weight spot on the rim, represented as vector co1, coincides with the location of one of the attachment clips 1 of a decorative trim ring 2. The trim ring cannot be rotated because of the clearance notch 3 for the valve stem 4. A bend in the rim lip could also curtail the placement of the weight.

In the prior art the user will instead choose two weights which are half the single weight value and install them straddling the obstruction, but the weight magnitude error is even greater than the process described in connection with FIG. 2 because the angular displacement between the two weights is further increased due to the presence of the obstruction. The chance for magnitude error is further increased when the single weight cannot be divided by two with an incremental weight size as a result. An example of this is 4.25 ounces. The user cannot determine what to do at this point because 2.125 ounce weights are not available. He must now resort to trimming 2.25 ounce weights or adjust the angle between the weights without guidance by the machine. No present systems offer a method to assist the user when he wishes to use two weights on a correction plane instead of the displayed single weight.

A fourth problem in the prior art is how the user is guided by the display to turn the wheel to a weight placement spot. To provide two weight locations to the user in the present invention, two LEDs or other display devices must be on at the same time to most clearly show the user that the original single weight will now be applied as the sum of two weights. Most balancers have but three to five LEDs on a bar graph display, which of course would result in a confusing display if two bars were lit.

U.S. Pat. 4160384 to Guyot describes an LED display which has seven LEDs per bar graph. As shown in FIG. 5, the LEDs are spaced at closer intervals towards the center target location 5 which is the 12 o'clock weight placement point. These LEDs are provided to represent weight positions from 12 o'clock +/−90 degrees rotation of the tire. The angular change of the physical tire to cause an adjacent LED on the display to come on also decreases as the LEDs approach the target position. The intention is that the weight position can be found without overshooting the target position as this position is approached while the tire is turned by the user.

To represent two weight positions, however, the Guyot method results in a confusing display if used with the present invention. The two lit LEDs which represent the two weight locations will not maintain a fixed spacing from each other due to the decreasing intervals between the LEDs on the bar. When turning the tire with one of the two weights at the target position, the other weight appears to be changing its position with respect to that weight. Even if the LEDs are equally spaced, the decreasing tire position phasing between lit LEDs described above causes the same undesirable effect.

Furthermore, as a weight location moves more than 90 degrees away from the target position, the 90 degree LED 6 "sticks" on until the weight location moves past the 180 degree point 7 and is then closer to the −90 degree point. At this time the 90 degree LED 6 turns off and the −90 degree LED 8 turns on. The display is very confusing when two LEDs representing two weight locations are moving around as the tire is rotated. The two LEDs merge into one as they both are rotated past 90 degrees, and both the 90 degree LED 6 and the −90 degree LED 8 are on at once as the two weight locations straddle the 180 degree point 7.

The current invention introduces a novel method to display two weight locations with no ambiguity or confusion as to their location on the wheel. As will become obvious in the description which follows, this display usage also provides an improved understanding of single weight positions when applying one weight per correction plane.

SUMMARY OF THE INVENTION

Among the various objects and features of the present invention is the provision of new advantages in imbalance correction using only incremental size weights of any size desired and with no residual imbalance.

A second object of the invention is to provide an easy to use procedure to produce imbalance corrections when the displayed weight amount is not convenient for the user.

A third object of the invention is to provide an easy to use procedure to produce imbalance corrections when the displayed weight placement spot is not convenient for the user.

A fourth object of the invention is to provide a superior display in terms of informing the user of the exact location(s) of the required weight placement spot(s).

Other objects and features will be in part apparent and in part pointed out hereinafter.

Briefly, the normal one-weight-per-plane mode of the balancer of the present invention can be overridden by the use of an optional "split weight" mode software feature which produces the imbalance correction as the vector sum of two weights which are standard amount values. The display guides the user to the two angles required for new size weights. This feature eliminates residual imbalances left by one-weight-per-plane placement angle-alteration systems, and improves upon the single mass weight systems by providing a variety of choices for the size of the "split" weights. It improves upon all balancers of the prior art in its ability to guide the user to "split" the weight when the called-for single weight lies on an obstruction, is out of the range of available weights, is out of stock, or is simply too large to be reliably applied as one piece.

Apparatus of the present invention for balancing a wheel and tire assembly includes apparatus for measuring imbalance of a wheel and tire assembly and for determining the magnitude and placement of a first single correction weight in an inner correction plane and the magnitude and placement of a second single correction weight in an outer correction plane to substantially correct the imbalance. A display responsive to the measuring and determining apparatus displays the magnitude and placements of the first and second single correction weights to the user. A manually operable key provides a split weight signal to the measuring and determining apparatus, which is responsive to the split weight signal to determine for at least one of the first or second single correction weights at least a pair of weight magnitudes and weight placements which are vectorially equivalent to the corresponding single correction weight in terms of correcting imbalance. The display is responsive to determination of the at least a pair of weight magnitudes and weight placements to display the magnitude and weight placements to the user.

In a second aspect of the present invention, a method for balancing a wheel and tire assembly includes the steps of measuring the imbalance of a wheel and tire assembly, determining a single correction weight magnitude and placement for an inner correction plane and a single weight magnitude and placement for an outer correction plane to correct for the imbalance, and placing a smaller weight than the weight determined in the previous step for one plane at the placement determined in that plane in the previous step. The imbalance of the wheel and tire assembly is then measured again with the smaller weight thereon, a pair of correction weight magnitudes and placements in the plane to correct for the resulting residual imbalance is determined, and the pair of correction weights are placed on the assembly at the placements determined in the previous step.

In a third aspect of the present invention a method for balancing a wheel and tire assembly includes the steps of measuring the imbalance of a wheel and tire assembly, determining a pair of correction weight magnitudes and placements for at least one of the correction planes, and placing a pair of weights at the placements calculated in the previous step, which weights have magnitudes smaller than those determined in the previous step. Then the imbalance of the wheel and tire assembly is measured with the pair of weights thereon, a second pair of correction weight magnitudes and placements are determined which do not overlap the first pair to correct for the resulting imbalance, and the second pair of correction weights are placed on the assembly at the placements determined in the previous step.

BRIEF DESCRIPTION OF THE DRAWINGS

FIG. 1 is a diagrammatic view illustrating the system of U.S. Pat. No. 4891981 to Schonfeld;

FIG. 1A is a cross-sectional view of the apparatus of FIG. 1;

FIG. 2 is a diagrammatic view illustrating magnitude error when attempting to divide a required weight into two half-size weights;

FIG. 3 is a force diagram illustrating the system of U.S. Pat. No. 4068532 to Green et al;

FIG. 3A is a cross-sectional view of the system of FIG. 3;

FIG. 4 is a front elevation illustrating an example of an obstruction existing at the intended weight placement spot;

FIG. 4A is a cross-sectional view of the apparatus of FIG. 4;

FIG. 8 is a front elevation of the front panel display of the present invention;

FIG. 9 is a diagrammatic view illustrating the orientation of the display of FIG. 8 with respect to the wheel balancer of FIG. 6 and the user;

FIG. 11 is a time sequence illustration of how the front panel position indicators are utilized in the "split weight" mode.

Similar reference characters indicate similar parts throughout the several views of the drawings.

DESCRIPTION OF THE PREFERRED EMBODIMENT

Figure 6:
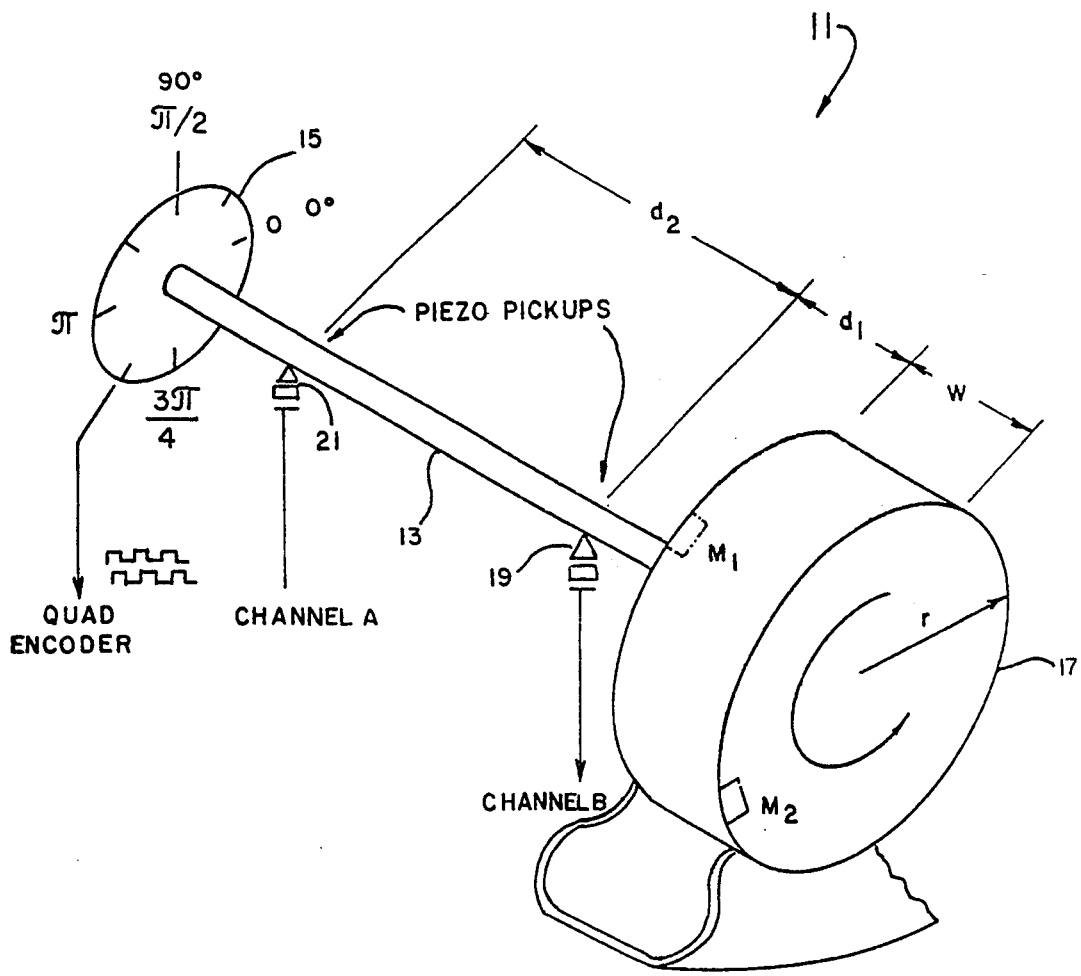
FIG. 6 is a schematic illustrating the mechanical and sensing portions of a wheel balancer which incorporates the present invention.
Figure 7:
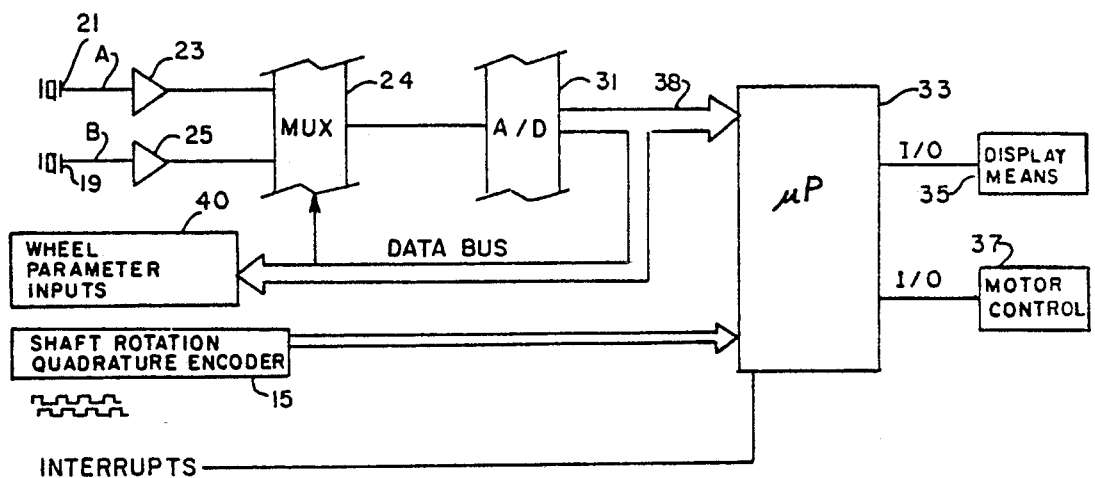
FIG. 7 is a block diagram illustrating the electronics of the wheel balancing apparatus of the present invention.

Turning to the drawings, FIG. 6 illustrates the mechanical aspects of a wheel balancer 11 which incorporates the present invention. As will become apparent, the particular mechanical and electronic aspects of the wheel balancer 11 are largely irrelevant to the present invention in that the present invention can be implemented on any number of different balancers with the same result. By way of example only, balancer 11 includes a rotatable shaft 13 driven by a suitable drive mechanism such as an electric motor (not shown). Mounted at one end of shaft 13 is a conventional quadrature phase optical shaft encoder 15 which provides speed and rotational position information to the circuitry of FIG. 7. As mentioned above, it should be understood that the parts illustrated in FIG. 6 and the particular circuitry of FIG. 7 are conventional and that the present invention is not limited to the system shown.

At the other end of shaft 13 a wheel/tire assembly 17 under test is removably mounted for rotation with the shaft. There are several parameters associated with wheel/tire assembly 17 which are needed in determining the imbalance characteristics of the assembly. These are the radius "r" of the wheel, the width "w" of the wheel rim, and the distance "d1" from the inner correction plane to a reference point on the balancer. It should be understood that these parameters will vary from system to system and that the present invention is not limited in any way to the particular set of parameters used in determining imbalance characteristics.

The ultimate function of wheel balancer 11 is to balance the wheel/tire assembly by determining the values and rotational placements of two imbalance correction masses "m1" and "m2" which are shown disposed on two correction planes of assembly 17. To determine these the balancer includes at least a pair of piezoelectric transducers 19 and 21 coupled to the shaft 13 and disposed distances "d1" and "d1+d2" from the wheel/tire assembly along the shaft. These distances are also taken into account by the circuitry of FIG. 7 in calculating the values and placements of masses "m1" and "m2." Equations used in calculating these values and placements are well known in the art and do not make up part of the present invention.

When wheel/tire assembly 17 is unbalanced, it vibrates in a periodic manner, and these vibrations are transmitted to shaft 13. Transducers 19 and 21 are responsive to these vibrations of shaft 13. Specifically, they generate a pair of analog electric signals corresponding in time and magnitude to the vibrations of the shaft at the particular transducer locations. These analog signals are supplied over a pair of channels, labeled "A" and "B" to a pair of anti-aliasing filters 23 and 25. Aliasing, a phenomenon of sampled-data systems, simply refers to the appearance in digitally processed signals of frequency components that do not exist in the actual data stream. For a more detailed description of data acquisition and the electronics of wheel balancers of this type, reference is made to co-pending application Ser. No. 07/594,043, the disclosure of which is incorporated herein by reference.

Wheel balancer 11 also includes a protective hood (not shown). When this hood is not down, an interrupt signal is sent to the circuitry of FIG. 7 to disable the main drive means of shaft 13. Such hoods with a safety interlock feature are well-known. The balancer also includes conventional control switching (also not shown).

Turning to FIG. 7, the wheel balancer includes not only transducers 19 and 21, and anti-aliasing filters 23 and 25, but also a multiplexer 24, an analog-to-digital converter 31, a microprocessor (or other suitable circuitry) 33, a display 35, and motor controller 37.

After passing through the anti-aliasing filters, the analog transducer signals are multiplexed by multiplexer 24, and then digitized by analog-to-digital converter 31. Note that this method of data acquisition is illustrative only and that the present invention is not limited in this respect. The data streams are fed to chip 33 via a data bus 38.

Position information is provided to chip 33 via quadrature phase encoder 15 coupled to the rotating main shaft, which signals are fed to the chip via its I/O ports. Interrupts, such as wheel hood safety switch and motor protection, are also handled by the chip. Wheel parameters, such as rim radius "r," rim width "w" and reference distance "d1" are fed to the chip via manual controls 40, or alternatively via an automatic data-entry method (not shown). Chip 33 I/O ports also control the motor drive circuits 37 and the displaying of correction weight values and locations on display 35. These various input and output devices do not form part of the present invention. Suitable input and output devices are shown in co-pending U.S. application Ser. No.

07/665,674, the disclosure of which is incorporated herein by reference.

Referring to FIG. 8, the display has an inner plane placement LED bar graph 41, an outer plane bar graph 43, inner imbalance magnitude digits 45, outer magnitude digits 47, a left target LED for 12 o'clock position 49, and a right target LED for 12 o'clock position 51. A "split weight" key 53 and a "next" key 55 are provided as part of a membrane keypad 57 to enter and operate the "split weight" mode.

Fifteen LED bars or display elements per bar graph (41,43) with equal spacing were chosen to provide the required resolution when displaying two weights at the the same time while in split weight mode. It has been found that the HLCP series four-element bar graphs manufactured by Hewlett-Packard are suitable for this purpose. Four of these devices are stacked end-to-end on each bar graph. The bottommost element of the lowest device in each bar graph is covered by the display overlay artwork to result in fifteen (15) total visible bar segments.

Referring to the right bar graph 43, as a weight position on the wheel is moving near the target 51 (12 o'clock weight placement position on the physical wheel as shown in FIG. 9), the LEDs change at equal intervals of actual wheel angle movement. This allows two weight locations, or two lit LEDs, to move as the wheel is rotated and maintain constant LED spacing in the process. As a weight approaches the +/−90 degree positions, corresponding to the top and bottom LEDs of the bar graph, the LED movement slows down so as to provide the illusion of a three dimensional movement of the weight as if viewing the tire facing the tread.

A 128 count quadrature encoder provides 512 discrete steps to index the wheel. The user can program the balancer to choose one of two placement resolutions: 1/512 counts (+/0.35 degrees), or 2/512 counts (+/−0.7 degrees). The software refers to one of two tables of quadrature count limits corresponding to the currently selected placement resolution. These limits determine the range of quadrature counts allowed for each of the fifteen (15) LEDs to remain lit.

Two novel features are incorporated to greatly enhance the understanding of where the weight(s) are as the user views the bar graphs: Referring to FIGS. 8 and 9, the software determines from the current quadrature count if the weight is on the "top" side of the bar graph (less than 90 and greater than −90 degrees from the 12 o'clock point 51). If it is on the top, the target LED 51 is lit. If it is on the "bottom" of the bar graph (greater than 90 and less than −90 degrees from the 12 o'clock point 51), the target is not lit and LED resorts to a 1 Hz, 1/200 duty cycle blink. The low duty cycle makes the LED appear much dimmer than normal, and the blink gives a "hidden line" effect.

The combination of these two features makes it readily apparent when the weight position moves to the "bottom" and leaves no ambiguity of exactly where it is located on the "bottom" of the tire. The user cannot accidentally line up a blinking weight and apply a weight to the wheel (which would be putting a weight on 180 degrees off from the correct position) because the target LED 51 is not lit when the weight location is on the "bottom" of the tire. The advantages of this system are mandatory for clearly displaying the split weight locations of the present invention since the separation of the two locations means that one weight could be on the "top" while the other is on the "bottom". In this case the target LED 51 is on since one of the weights is on the "top." The weight on the "bottom" blinks, and the weight on the "top" stays on continuously.

It is possible that the two weights can be as much as 120 degrees apart. This means that the blinking weight position on the "bottom" could be aligned with the lit target LED 51 (lit because the other weight is on the "top"). If this occurs, the blinking weight is completely inhibited from illuminating when in line with the target LED 51, eliminating any tendency to apply a weight 180 degrees off.

If both weights are on the "bottom," then they both blink and the target LED 51 turns off.

The left bar graph 41 and target 49 of course function in the same manner as described. This method of display also is an improvement in displaying single weight-per-plane locations in normal modes. It is to be understood that all of the described display features could be implemented in other types of displays (CRT, LCD, etc) without deviating from the spirit of the invention.

Figure 10:
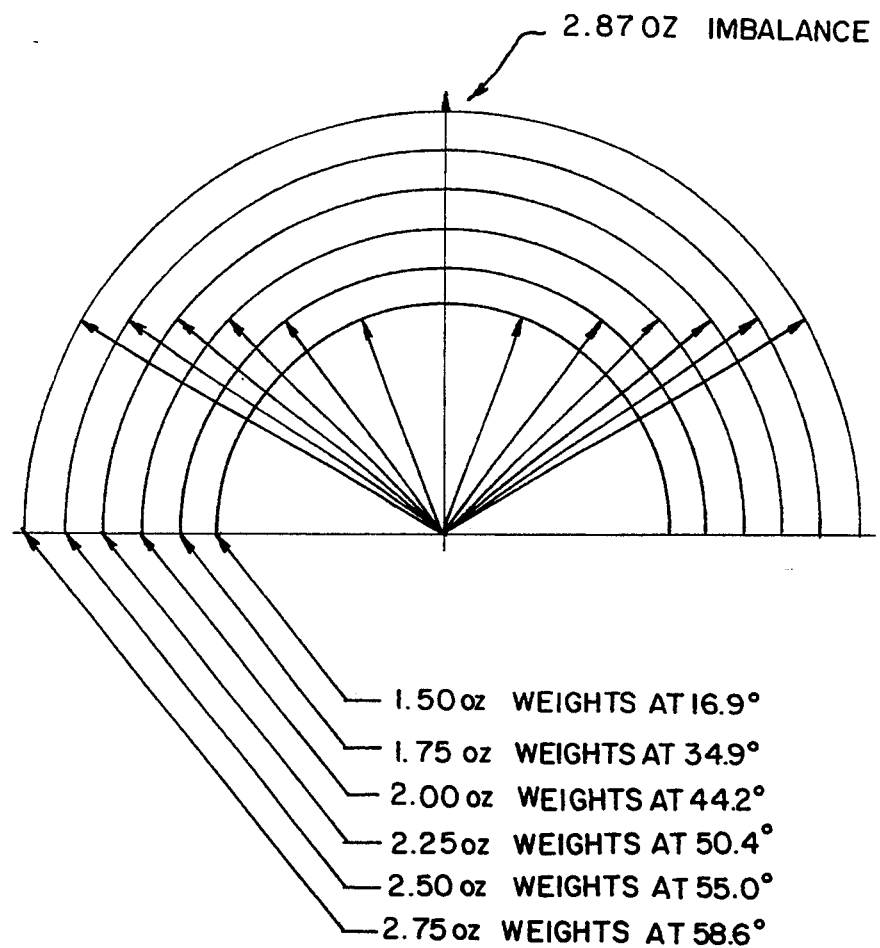
FIG. 10 is a graphical representation illustrating possible choices of weight magnitudes and locations using the present invention.
Figure 5:
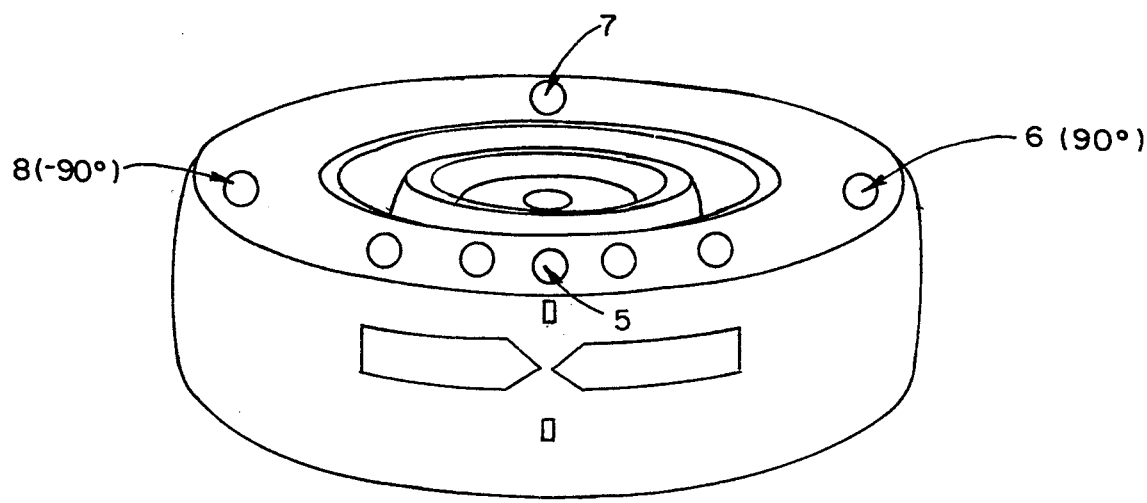
FIG. 5 is a perspective view illustrating the display system of U.S. Pat. No. 4160384 to Guyot et al.

At any time, the user can enter the "split weight" mode by pressing key 53 on FIG. 8. FIG. 10 shows possible placement angles and magnitudes to split a 2.87 ounce imbalance correction into two equal incremental weights. FIG. 11 shows an example sequence of the display resulting of splitting this weight using the right weight location bar 43 and the right magnitude digit set 47. Upon actuation of key 53, the right bar graph 43 splits into two lit LEDs. The right magnitude display 47 changes to the corresponding incremental weight for the current split. Each time the "split weight" key 53 is pressed, the LEDs split out further and the next incremental magnitude is displayed. If the incremental weight is calculated to be larger than the initial single weight rounded imbalance, the display reverts back to the single weight display.

If the rounded single weight amount is small, for example two (2) ounces, then the splits will be allowed to exceed two (2) ounces as the "split weight" key 53 is pressed to provide at least four choices of splits. This allows a wide range of splits for any size single weight amount. The computer does not use the rounded amount when in split weight mode, but instead provides exact imbalance correction by calculating the required angle displacement between the incrementally sized split weights.

The first split shown on FIG. 11, for example, is achieved by the software as follows:

1) 2.87 is divided by two, resulting in 1.435.

2) the next largest incremental sized weight is selected by rounding up to the the nearest 0.25, resulting in 1.50.

3) The angle separation from the original single weight position for each weight is computed as the inverse cosine of 1.435/1.5.

4) The distance between the centers of the two weights is computed as:

[(rim diameter)/2] * [sin(angle derived in step 3] * 2.

This distance is compared to the width of a 1.5 ounce weight from a look-up table of weight widths. If the distance is less than the width of the weight then step 2 is repeated (since this choice of weights would interfere physically if placed at the required angle). In this case, the 1.5 ounce weights are found not to interfere and the software proceeds to step 5.

5) The new bar graph locations are displayed as described in the display disclosure above. If the "split weight" key is pressed again, the next higher incremental weight for the split is chosen and steps 2 through 5 are repeated. The end result is a display of the weight amount and locations required to balance the plane with no residual imbalance, without angular placement guesswork and without weight trimming.

To apply the weights, the user simply aligns one of the "split" LEDs with the target 51 and applies the incremental weight displayed on the magnitude digits 47. He then rotates the tire to align the other "split" LED for that same plane with the target 51 and then applies the same size weight.

The first pressing of the "split weight" key 53 defaults to the splitting of the right, plane weight as shown in FIG. 11. If the user instead wishes to split the left plane, he simply presses the "next" key 55. The left plane will then split on the display while the right plane returns to the single weight representation. The user thus has a comprehensive yet accurate way to eliminate residual imbalance without weight trimming, whether for this reason alone or because the required correction weight is too large, out of stock, or somehow inconvenient to apply at the required location.

The split weight mode has a dedicated key to make the mode very easy to use. The present invention as well as balancers in the prior art, for instance, all feature a mode of operation to adjust the displayed weight amounts to pertain to locations inside of a wheel to apply adhesive-backed weights. These weights can be split just as easily as the normal hammer-on rim lip weights without the user stepping through extra menus while in the adhesive weights mode.

Another benefit of the separate key is that the wheel can be spun independently of whether or not "split weight" is in effect. This allows the user to split the weight into any number of weights he chooses. As a typical example, consider that the required single weight is very large, such as nine (9) ounces. Splitting this would still result in two large weights, so the user might wish to split it up even smaller. The "split weight" mode provides an easy solution: Apply one three ounce weight at the single weight location and spin the wheel. The display now will call for about six (6) ounces to be placed on top of the three ounce weight. Press the "split weight" key until the two weights of the split clear the already-applied three (3) ounce weight.

A single weight can even be split into four as follows: Split the single weight into the first choice (closest together) and apply weights which are half the magnitude called for by the "split weight" display. Spin the wheel and split the new result (repeatedly press the "split weight" key) until the split weights will clear the already installed weights.

In view of the above it will be seen that the various objects and features of the present invention are achieved and other advantageous results obtained. The description of the invention contained herein is intended to be illustrative only and is not to be taken in a limiting sense.

What is claimed is:

1. Apparatus for balancing a wheel and tire assembly comprising:

means for measuring imbalance of a wheel and tire assembly and for determining the magnitude and placement of a first single correction weight in an inner correction plane and the magnitude and placement of a second single correction weight in an outer correction plane to substantially correct the imbalance;

means responsive to the measuring and determining means for displaying the magnitude and placements of the first and second single correction weights to the user;

means for providing a split weight signal to the measuring and determining means, said measuring and determining means being responsive to the split weight signal to determine for at least one of the first or second single correction weights at least a pair of weight magnitudes and weight placements which are vectorially equivalent to the corresponding single correction weight in terms of correcting imbalance, the values of the pair of weight magnitudes being varied by the measuring and determining means as a function of the magnitude of the corresponding single correction weight;

said display means being responsive to the determination of said at least a pair of weight magnitudes and weight placements to display said magnitude and weight placements to the user.

2. The apparatus as set forth in claim 1 further including means for providing a signal to the measuring and determining means indicating for which correction plane a determination of additional weight magnitudes and weight placements are desired, said measuring and determining means being responsive to said correction plane indicating signal to determine the additional magnitudes and placements for the desired correction plane.

3. The apparatus as set forth in claim 1 wherein the display means includes means for displaying a plurality of discrete weight placements corresponding to a predetermined first half of the wheel represented by the display means using a first set of display elements and means for displaying a plurality of discrete weight placements corresponding to the remaining half of the wheel using the same first set of display elements, said display means including means for blinking and dimming a display element to indicate weight placement on the remaining half of a wheel.

4. The apparatus as set forth in claim 1 wherein the means for providing the split weight signal is a dedicated manually operable switch.

5. The apparatus as set forth in claim 1 wherein the measuring and determining means includes means for storing standard incremental weight magnitudes such as would typically be available to a user.

6. Apparatus for balancing a wheel and tire assembly comprising:

means for measuring imbalance of a wheel and tire assembly and for determining the magnitude and placement of a first single correction weight in an inner correction plane and the magnitude and placement of a second single correction weight in an outer correction plane to substantially correct the imbalance;

means responsive to the measuring and determining means for displaying the magnitude and placements of the first and second single correction weights to the user;

means for providing a split weight signal to the measuring and determining means, said measuring and determining means being responsive to the split weight signal to determine for at least one of the first or second single correction weights at least a pair of weight magnitudes and weight placements which are vectorially equivalent to the corresponding single correction weight in terms of correcting imbalance;

said display means being responsive to the determination of said at least a pair of weight magnitudes and weight placements to display said magnitude and weight placements to the user;

the measuring and determining means being responsive to the split weight signal to determine a first pair of weight magnitudes and placements equivalent to the corresponding single correction weight, said pair of weight magnitudes being smaller than said single correction weight; and the measuring and determining means being responsive to an additional occurrence of the split weight signal to determine a second pair of weight magnitudes and weight placements equivalent to the corresponding single correction weight, the weight magnitudes of the second pair being greater than the weight magnitudes of the first pair and the placements of the second pair being farther apart than the placements of the first pair.

7. The apparatus as set forth in claim 6 wherein the display means is responsive to the measuring and determining means to cease display of the first set of weight magnitudes and placements and to display the second set upon determination of said second set.

8. The apparatus as set forth in claim 6 wherein the measuring and determining means is responsive to each additional occurrence of the split weight signal to determine an additional pair of weight magnitudes and placements until the additional weight magnitudes individually exceed the original single correction weight magnitude.

9. The apparatus as set forth in claim 6 wherein the measuring and determining means is responsive to each additional occurrence of the split weight signal to determine an additional pair of weight magnitudes and placements independently of whether the additional weight magnitudes individually exceed the original single correction weight magnitude.

10. Apparatus for balancing a wheel and tire assembly comprising:

means for measuring imbalance of a wheel and tire assembly and for determining the magnitude and placement of a first single correction weight in an inner correction plane and the magnitude and placement of a second single correction weight in an outer correction plane to substantially correct the imbalance;

means responsive to the measuring and determining means for displaying the magnitude and placements of the first and second single correction weights to the user;

means for providing a split weight signal to the measuring and determining means, said measuring and determining means being responsive to the split weight signal to determine for at least one of the first or second single correction weights at least a pair of weight magnitudes and weight placements which are vectorially equivalent to the corresponding single correction weight in terms of correcting imbalance;

said display means being responsive to the determination of said at least a pair of weight magnitudes and weight placements to display said magnitude and weight placements to the user;

the measuring and determining means including means for storing standard incremental weight magnitudes such as would typically be available to a user;

the measuring and determining means being responsive to said split weight signal to select a pair of incremental weights each having a magnitude smaller than that of the single correction weight; and the measuring and determining means being responsive to additional split weight signals to increase the magnitude of the pair of equivalent weights to the next higher increment weight stored in the storing means.

11. Apparatus for balancing a wheel and tire assembly comprising:

means for measuring imbalance of a wheel and tire assembly and for determining the magnitude and placement of a first single correction weight in an inner correction plane and the magnitude and placement of a second single correction weight in an outer correction plane to substantially correct the imbalance;

means responsive to the measuring and determining means for displaying the magnitude and placements of the first and second single correction weights to the user;

means for providing a split weight signal to the measuring and determining means, said measuring and determining means being responsive to the split weight signal to determine for at least one of the first or second single correction weights at least a pair of weight magnitudes and weight placements which are vectorially equivalent to the corresponding single correction weight in terms of correcting imbalance;

said display means being responsive to the determination of said at least a pair of weight magnitudes and weight placements to display said magnitude and weight placements to the user;

the pair of weight magnitudes determined by the measuring and determining means being different.

* * * * *